(12) United States Patent
Kagota

(10) Patent No.: US 8,386,162 B2
(45) Date of Patent: Feb. 26, 2013

(54) ELECTRONIC DEVICE AND RECORDING MEDIUM

(75) Inventor: Yuichi Kagota, Fuchu (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 339 days.

(21) Appl. No.: 12/214,088

(22) Filed: Jun. 17, 2008

(65) Prior Publication Data

US 2008/0319662 A1    Dec. 25, 2008

(30) Foreign Application Priority Data

Jun. 19, 2007    (JP) ................. 2007-161117

(51) Int. Cl.
  *G01C 21/00*    (2006.01)
  *G01S 1/00*    (2006.01)
  *G01S 5/02*    (2010.01)
(52) U.S. Cl. .................... 701/408; 701/468
(58) Field of Classification Search .......... 701/408, 701/468

See application file for complete search history.

(56) References Cited

U.S. PATENT DOCUMENTS

| | | | | |
|---|---|---|---|---|
| 6,311,180 | B1 * | 10/2001 | Fogarty ........................ | 707/749 |
| 7,053,780 | B1 * | 5/2006 | Straub et al. ................. | 340/601 |
| 2003/0117297 | A1 * | 6/2003 | Obradovich et al. ......... | 340/905 |
| 2005/0114788 | A1 * | 5/2005 | Fabritius ....................... | 715/767 |
| 2006/0041556 | A1 * | 2/2006 | Taniguchi et al. ............. | 707/10 |
| 2007/0085759 | A1 * | 4/2007 | Lee et al. ...................... | 345/1.1 |
| 2008/0065326 | A1 | 3/2008 | Hoashi | |

FOREIGN PATENT DOCUMENTS

| | | |
|---|---|---|
| JP | 07-103777 | 4/1995 |
| JP | 152997 | 6/1995 |
| JP | 2000-028390 | 1/2000 |
| JP | 2000-348286 | 12/2000 |
| JP | 2000348286 A * | 12/2000 |
| JP | 2000348288 A * | 12/2000 |
| JP | 2003-240586 | 8/2003 |
| JP | 2003240586 A * | 8/2003 |
| JP | 2005-300225 | 10/2005 |
| JP | 2005-321268 | 11/2005 |
| JP | 2006-093954 | 4/2006 |
| JP | 2007-049562 | 2/2007 |
| JP | 10-094028 | 4/2008 |
| WO | WO 2005/013586 | 2/2005 |

* cited by examiner

*Primary Examiner* — Thomas Tarcza
*Assistant Examiner* — Imran Mustafa
(74) *Attorney, Agent, or Firm* — Cozen O'Connor

(57) ABSTRACT

A controller determines whether or not the map data that includes the position information of the user device and the position information of the other party can be displayed on the screen of the display panel at a predetermined reduced scale. When the result of the determination specifies that the map that includes the position information of both parties cannot be displayed at the predetermined reduced scale, the controller 11 splits the display panel into two screens, and displays the map data that include the user device position information and the map data that include the other party position information on separate screens. When the result of the determination specifies that the map that includes the position information of both parties can be displayed, the central control device displays the single map data that include the position information of both parties on the single screen of the display panel.

9 Claims, 12 Drawing Sheets

FIG. 2A — OPEN STYLE

FIG. 2B — VIEW STYLE

POSITION INFORMATION M1

| DATE/HOUR | USER DEVICE POSITION INFORMATION | OTHER PARTY POSITION INFORMATION |
|---|---|---|
| OCTOBER 10; 10:10:00 | XXXXXXXXXXXX | XXXXXXXXXXXX |
| OCTOBER 10; 10:09:30 | XXXXXXXXXXXX | XXXXXXXXXXXX |
| OCTOBER 10; 10:09:00 | XXXXXXXXXXXX | XXXXXXXXXXXX |
| OCTOBER 10; 10:08:30 | XXXXXXXXXXXX | XXXXXXXXXXXX |
| ... | XXXXXXXXXXXX | XXXXXXXXXXXX |

SETTING INFORMATION  M2

| TYPE | CONTENT |
| --- | --- |
| REDUCED SCALE | XXXXXXXXXXXX |
| ACQUISITION TIMER | 30 SEC |
| SWITCHING TIMER | 10 SEC |

● ⋯ USER DEVICE POSITION INFORMATION

★ ⋯ OTHER PARTY POSITION INFORMATION

ELECTRONIC DEVICE AND RECORDING MEDIUM

BACKGROUND OF THE INVENTION

1. Field of the Invention

The present invention relates to an electronic device that controls the screen of a display panel, and a recording medium that records a program which is executed by the foregoing electronic device.

2. Description of the Related Art

Portable telephone devices, which have a navigation function to obtain the current position information of the device user and the current position information of the other party so as to display the position information of both parties on a map, have been in practical use as pedestrian aids in recent years. In addition to a conventional art which displays a map that includes the position information of the device user and a map that includes the position information of another party on separate screens, Unexamined Japanese Patent Application KOKAI Publication No. H07-152997 discloses a technology which displays a map that includes the position information of the device user and a map that includes the position information of another party on a single screen as a technology of displaying the position information of both parties on a map via the navigation function.

The former conventional art is capable of expanding and displaying the respective maps separately by displaying a map that includes the position information of the device user and a map that include the position of another party on separate screens. The user is thus able to confirm the details of the respective locations of himself and the other party. The latter conventional art allows the user to easily confirm the distant relationship between himself and the other party by displaying the maps that include the position information of both parties on a single screen.

In the former conventional art, however, it is difficult for the user to confirm the distant relationship between himself and the other party, and in the latter conventional art, it is difficult for the user to confirm the details of the respective surroundings of himself and the other party. A problem therefore arises inasmuch as a user cannot confirm the information he wishes to confirm by displaying either screen alone.

SUMMARY OF THE INVENTION

An object of the present invention is to eliminate this problem by enabling a user to confirm the positional relationship between a first position and a second position, as well as details of the respective surroundings of the first position and the second position without burdening the user with special operations.

This object is achieved by the electronic device of the present invention, which has a display panel that is splittable into a plurality of screens, and controls whether the display panel is used as a plurality of split screens, or whether the display panel is used as an integrated screen of the combined individual split screens, comprising: a position obtaining unit configured to obtain a first position information and a second position information; a first control unit configured to perform splitting controls to split the display panel for use as a plurality of screens, and display controls to display a map data that includes the first position information and a map data that includes the second position information in each separate split screen; a second control unit configured to perform integrating controls to use the display panel as an integrated screen, and display controls to display a map data that includes the first and the second position information on the integrated screen; a determining unit configured to determine whether or not a map data that includes the first and the second position information can be displayed on the display panel at a predetermined reduced scale; and a first switching unit configured to switch between the control by the first control unit and the control by the second control unit based on the result of the determination by the determining unit.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

An embodiment of the present invention is described hereinafter with reference to FIGS. 1 through 10. In this embodiment, the electronic device of the present invention is a portable telephone device.

Figure 1:
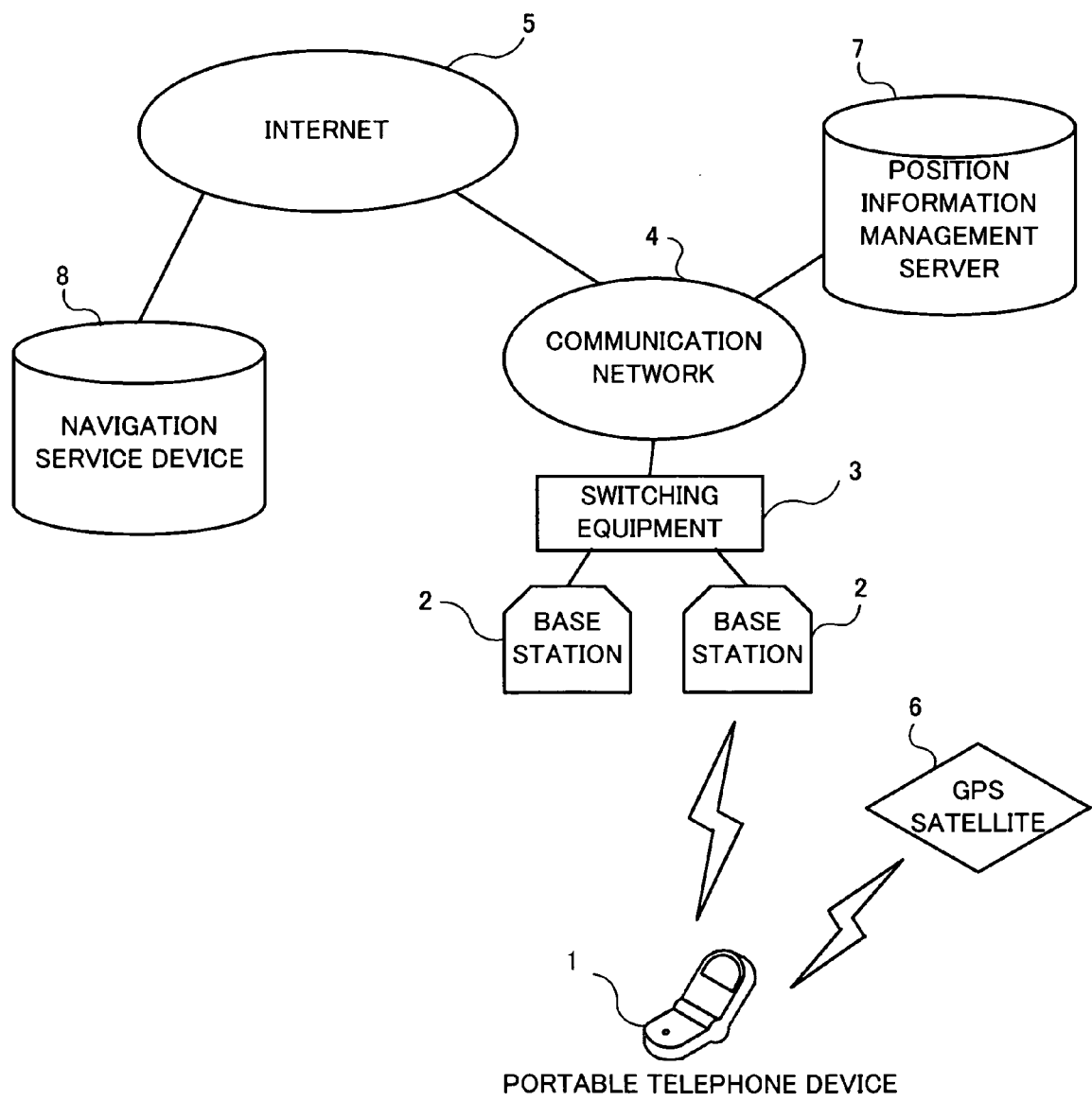
FIG. 1 is a block diagram showing a communication network system of an embodiment of the portable telephone device of the present invention.

The communication network system related to the present invention includes a portable telephone device 1, a base station 2, a switching equipment 3, a communication network 4, the Internet 5, a GPS satellite 6, a position information management server 7, and a navigation service device 8, as shown in FIG. 1.

The portable telephone device 1 has the functions provided in a typical multi-function portable telephone, which includes a call function, an electronic mail function, an Internet connection function (Web access function), a navigation function and the like.

The navigation function is, for example, a function that assists pedestrians by obtaining information of the current position of the device user and information of the current position of the other party so as to display the position information of both parties on a map for guidance. This navigation function can be used in cases such as when the two parties mutually draw near as the user goes to meet the waiting party, and in other discretionary cases. In this case, the "user device position information" indicates the current position of the portable telephone device 1 itself. This position information may be calculated based on signals received from the GPS (Global Positioning System) satellite 6, obtained from the position information management server 7 which is connected to the portable telephone device 1 through the communication network 4, or may be obtained from the navigation service device 8 through the Internet 5 or the communication network 4.

Furthermore, the "the other party position information" indicates, for example, the current position of a portable telephone device 1 in the possession of the waiting party. This position information may be obtained from the portable telephone device 1 of the other party through the communication network 4, obtained from the position information management server 7 which is connected through the communication network 4, or may be obtained from the navigation service device 8 through the Internet 5 or the communication network 4.

The position information management server 7 is a server that manages the positions of the portable telephone devices 1. The navigation service device 8 is a device that manages the positions of the portable telephone devices 1 that subscribe to the service, and transmits map data to the requesting portable telephone device 1 in accordance with the request from the portable telephone device 1. The map data may be downloaded from the navigation service device 8, or the map data of a specific map may be obtained from removable storage media (not shown in the drawings). The method of obtaining the map data is discretionary.

Figure 2:
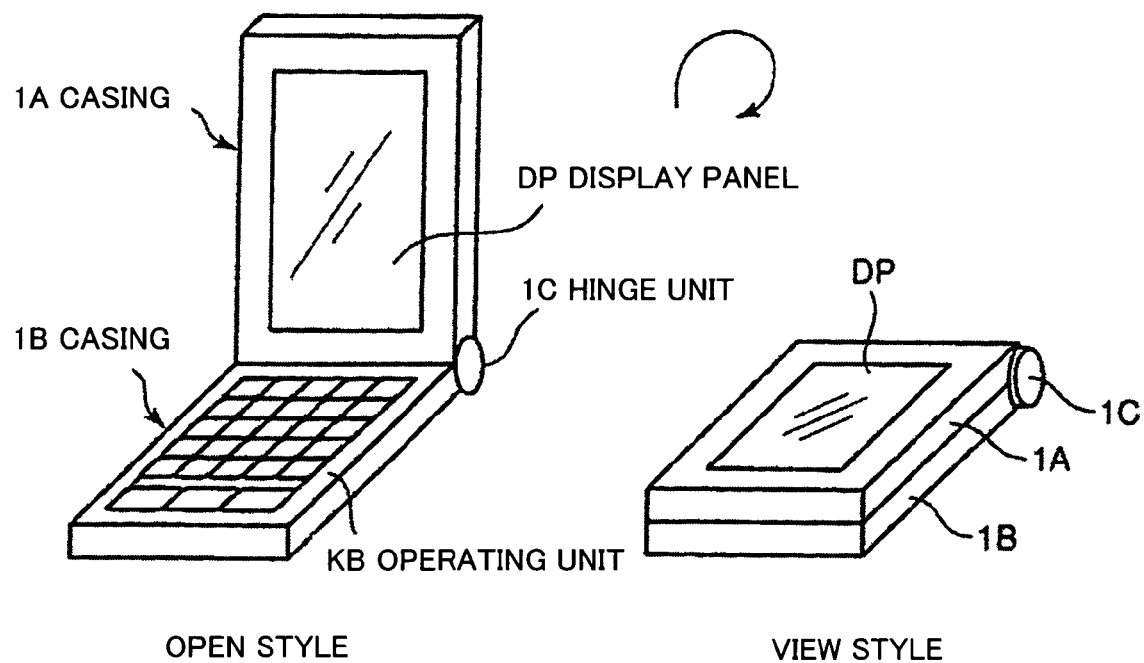
FIGS. 2A and 2B show external views of a portable telephone device.

FIG. 2 is a brief external view of a rotating dual axis type portable telephone device 1. The two casings 1A and 1B that configure the device body are coupled so as to be capable of opening and closing via a hinge unit 1C. The two casings 1A and 1B are also coupled so as to be rotatable via the rotational axis (longitudinal axis) of the hinge unit 1C. The portable telephone device 1 can thus be modified in a plurality of styles. FIG. 2A shows an open style representing the condition of the portable telephone device 1 when the two casings 1A and 1B have been opened. FIG. 2B shows a view style representing the condition of the portable telephone device 1 when the casing 1A has been rotated 180 degrees from the open style so as to be overlaid on the casing 1B. The condition wherein the casing 1A is changed from the open style so as to be overlaid on the casing 1B is referred to as a closed style. The casing 1A is a display panel casing that has a display panel DP, which uses fine liquid crystal or organic EL, arranged on the interior surface of the casing (the side facing the casing 1B in the closed style). The casing 1B is an operating unit casing that has an operating unit KB, which is provided with push button type keys, arranged on the interior surface of the casing. The operating unit KB may also be provided with a touch screen (touch panel display panel) in which transparent touch sensors are laminated on the display panel.

Figure 3:
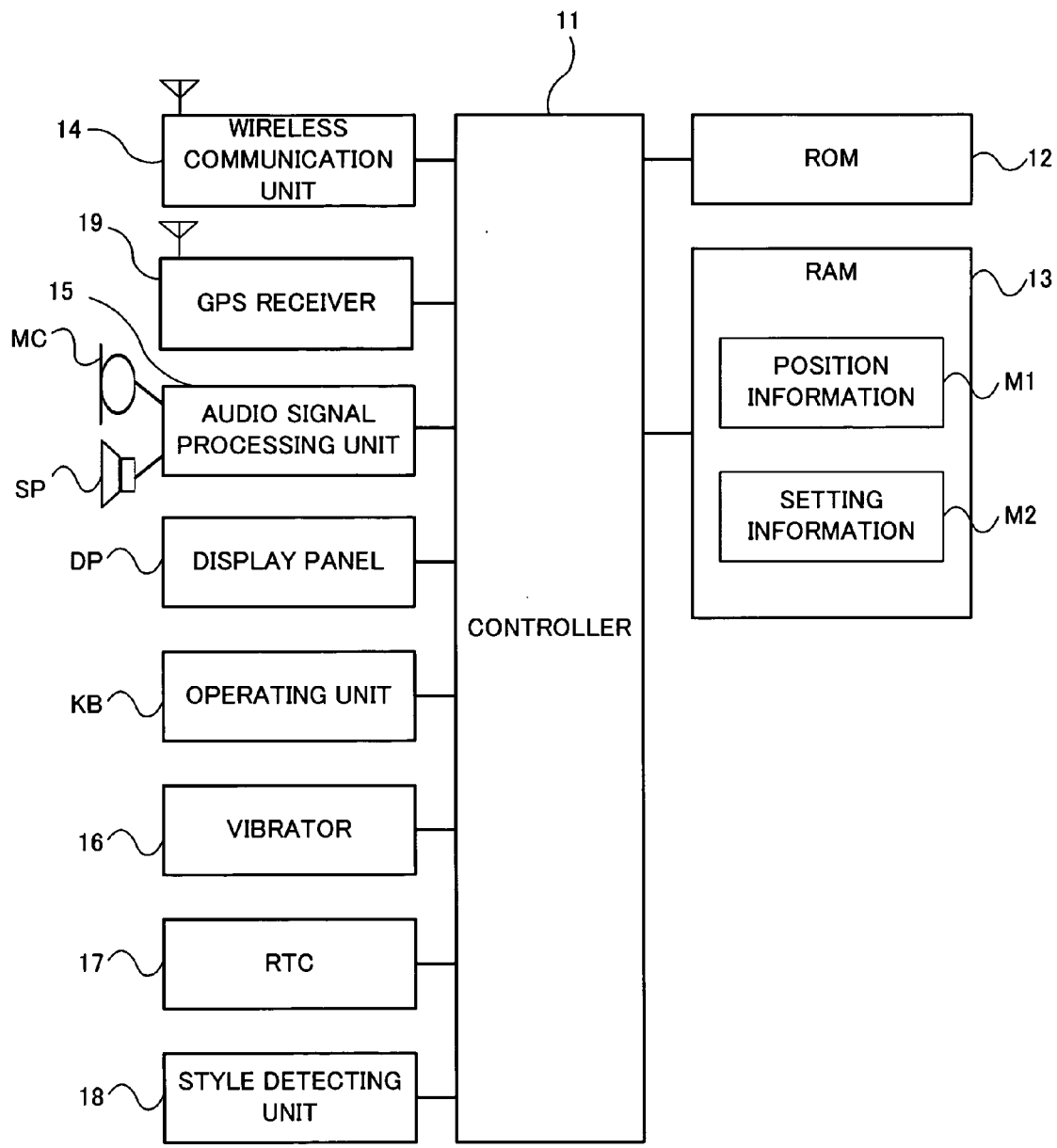
FIG. 3 is a block diagram showing the basic structural elements of the portable telephone device.

As shown in FIG. 3, the portable telephone device 1 is configured by a controller 11, a ROM 12, a RAM 13, a wireless communication unit 14, an audio signal processing unit 15, a vibrator 16, an RTC 17, a style detecting unit 18, a GPS receiver 19, a display panel DP, and an operating unit KB.

The controller 11 controls the overall operation of the portable telephone device 1 by executing various types of programs stored in the ROM (Read Only Memory) 12.

Program codes that realize the present embodiment according to an operating sequence that will be described later are stored in the ROM 12. The controller 11 sequentially executes each type of program in accordance with the program code. Map data are also stored in the ROM 12.

The RAM (Random Access Memory) 13 is a readable/writable memory. Position information M1 and setting information M2, which will be described later, are stored as data tables in the RAM 13.

The wireless communication unit 14 receives and modulates the signals from the receiver side of a transmitter-receiver (baseband unit), which is connected to an antenna, to reception baseband signals, and thereafter outputs the audio data from a receiver speaker SP through the audio signal processing unit 15. The wireless communication unit 14 receives, from the audio signal processing unit 15, the audio data input to the audio signal processing unit 15 from a transmission microphone MC, encodes audio data to transmission baseband signals, and thereafter outputs the encoded signals from the antenna provided on the wireless communication unit 14.

The vibrator 16 is configured by a compact vibration motor or the like. When the vibrator 16 is operated and a vibration is generated, the portable telephone device 1 vibrates due to this vibration.

The RTC (Real-Time Clock) 17 keeps track of the current date and hour (year/month/day/hour/minute/second). The RTC 17 transmits the time information in accordance with requests from the controller 11.

The style detecting unit 18 is configured by a magnetic sensor, microswitch or the like. The style detecting unit 18 detects any one of the style among the closed style, open style, view style, or other styles based on the positional relationship with both of the two casings 1A and 1B of the portable telephone device 1.

The GPS receiver 19 receives the current position information of the user device from the GPS satellite 6.

The display panel DP has an overall rectangular screen. In this screen are displayed split screens, which logically split the entire screen into a plurality of screens (e.g. two screens) with the center part in the longitudinal direction forming a boundary between the two screens, or the screen displays as a single screen (integrated screen) without being split. The controller 11 controls the display by determining whether the entire screen of the display panel DP is to be used as an integrated screen, or used as a split screen divided into two screens, when map data are displayed on the display panel DP by the navigation function.

That is, the controller 11 determines whether or not the map data that includes the position information of the user device and the position information of the other party can be displayed on the screen of the display panel DP at a predetermined reduced scale. As a result, the controller 11 performs controls to split the screen of the display panel DP into two screens to display the respective map data separately when the two parties are separated by a distance so that the map that includes the position information of both parties cannot be displayed at the predetermined reduced scale. Then, the controller 11 displays the map data that includes the position information of the user device and the map data that includes the position information of the other party in the separate split screens at the predetermined reduced scale.

Furthermore, when the user and the other party draw near to each other and the reduced scale map data that include the position information of both the user device and the other party can be displayed in an integrated screen, the controller 11 controls the screen of the display panel DP as an integrated screen to display the map data that include the position information of both the user device and the other party within this integrated screen at the predetermined reduced scale.

The control to modify the reduced scale to display, on the split screens, the expanded maps that include the map data of the surroundings of each position is referred to as an "individual display (separate screen display)" below. Furthermore, the control to display the map data that include the positions of the user device and the other party on the integrated screen at the predetermined reduced scale is referred to as a "simultaneous display (one screen display)."

The controller 11 determines whether or not the map data of the predetermined reduced scale, which include the position information of both the user device and the other party, can be displayed based on the relationship between the reduced scale of the map and the distance of both parties as described above, and automatically switches between the "individual display" and the "simultaneous display" based on the result of the determination. The controller 11 thus automatically switches between the "individual display" and the "simultaneous display" according to the distant relationship between the two parties, and periodically switches (timer switching) between the "individual display" and the "simultaneous display" according to a switching timer that is described later.

The operating unit KB is configured by key pads and the like. The controller 11 performs processing in accordance with the operation from the operating unit KB input by the user.

The position information M1 and the setting information M2 will be described below.

Figure 4:
FIG. 4 illustrates a position information.

The position information M1 is a data table that associates and stores the position information of the user device and the position information of the other party which are obtained periodically (for example, every 30 seconds). The position information M1 is, as shown in FIG. 4, configured by items such as "date/hour," "user device position information," and "other party position information."

"Date/hour" indicates the date and hour at which the position information was obtained, and "user device position information" and "other party position information" indicate the latitude and longitude at the current positions of both the user device and the other party. Although the portable telephone devices 1 of the user and the other party are mobile as they mutually draw near and the waiting party is approached, the position of the other party (the destination) does not change during the approach to the destination. Thus, since the controller 11 does not need to periodically obtain the position information of the other party, only the initially obtained position information is stored in the "other party position information" category.

The setting information M2 is a data table that stores various types of setting information related to the navigation function of the portable telephone device 1. The setting information M2 stores information that is preset by user operation at the discretion of the user. The setting information M2 is configured by storing "content" that corresponds to the "reduced scale," "acquisition timer," and "switching timer."

Figure 5:
FIG. 5 illustrates a setting information.

The "reduced scale" is the reduced scale of the map (for example, 1/500 or the like) when the map data are displayed on the display panel DP used as an integrated screen. The "acquisition timer" is a set value of a countdown timer that measures the time at which to periodically obtain the position information of the user device and the position information of the other party (mobile position information). FIG. 5 shows an example of the "content" of the "acquisition timer" when the setting specifies the acquisition of each position information at "30 second" intervals. The "switching timer" is a set value of a countdown timer that measures the time at which to periodically switch between the "individual display" and the "simultaneous display." FIG. 5 shows an example of the "content" of the "switching timer" when the setting specifies the display should be switched at "10 second" intervals.

Figure 6A:
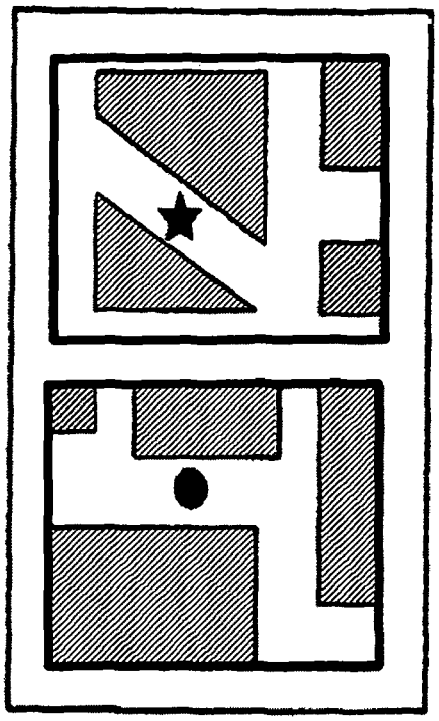
FIG. 6A shows individual displays as an example of navigation displays with view styles.
Figure 6B:
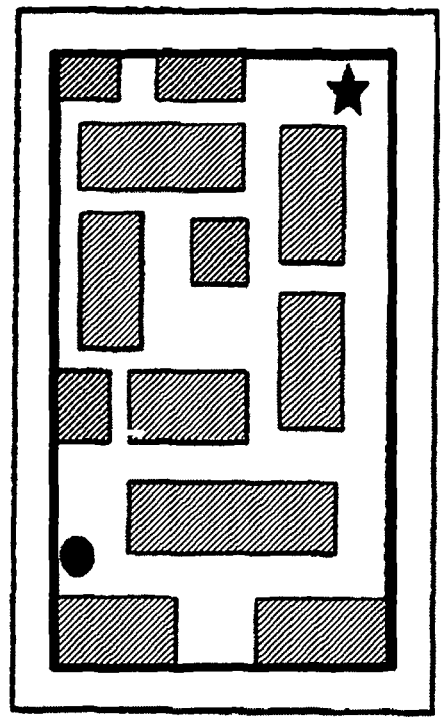
FIG. 6B shows a simultaneous display as an example of navigation displays with view styles.
Figure 7A:
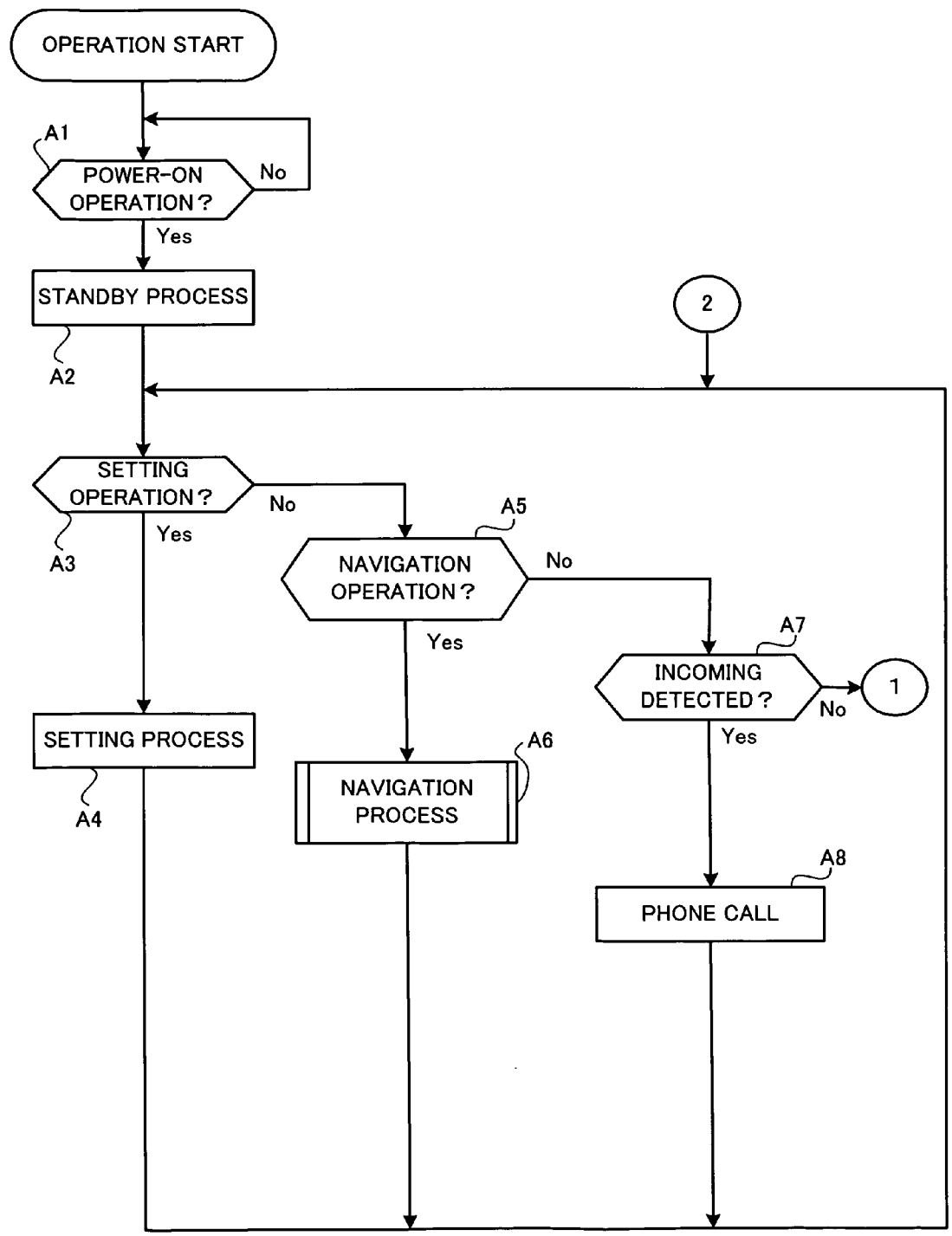
FIGS. 7A and 7B are flowcharts showing a summary of the overall operation of the portable telephone device.
Figure 7B:
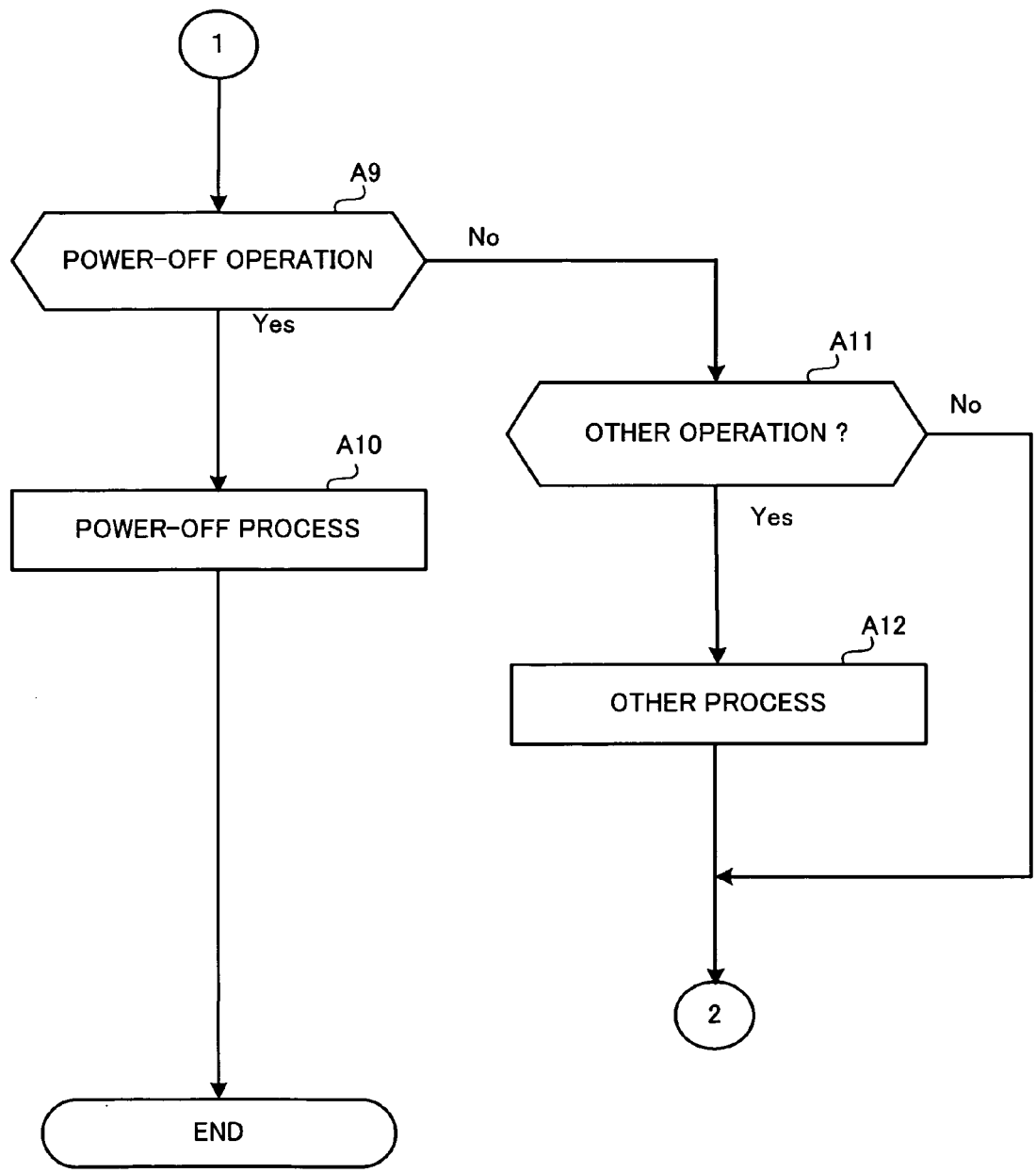

FIGS. 6A and 6B show examples of the navigation display in the view style. FIG. 6A shows a specific example of the "individual display" that displays an expanded map that includes the map of the surroundings at a modified reduced scale and corresponds to the user device position and the other party position, and FIG. 6B shows a specific example of the "simultaneous display" that displays a map that includes the user device position and the other party position in an integrated screen.

In the drawing, the black circle symbol represents the position information of the user device, and the black star symbol represents the position information of the other party. In the individual display example shown in FIG. 6A, map data that includes the user device position information are expanded to the screen size and displayed in the bottom split screen among the two split screens formed by splitting the entire screen of the display panel DP. Map data that includes position information of the other party are also expanded to the screen size and displayed in the top split screen. In the example of the simultaneous display shown in FIG. 6B, the entire screen of the display panel DP is used as an integrated screen, wherein the map data that includes the position information of both the user device and the other party are displayed according to the "reduced scale" of the setting information M2.

The operation of the portable telephone device 1 is described below with reference to the flow charts of FIGS. 7 through 10.

When the main power supply of the portable telephone device 1 is turned ON, power is supplied to the controller 11. Then, the controller 11 starts the process shown in FIGS. 7A and 7B. The controller 11 repeats the determination of the power ON operation of the power supply (step A1).

When the user turns on the power by operating the operating unit KB, the controller 11 detects the operation (step A1: YES) and executes a standby process to enter the communication standby state (step A2). When there is an instruction to modify the content of the setting information M2 during the communication standby state (step A3: YES), the controller 11 performs a setting process that modifies the "content" of the setting information M2 in accordance with the instruction from the user (step A4).

When the user issues an instruction to activate the navigation function of the portable telephone device 1 during the standby state (step A5: YES), the navigation process shown in FIGS. 8A and 8B is started (step A6).

Figure 8A:
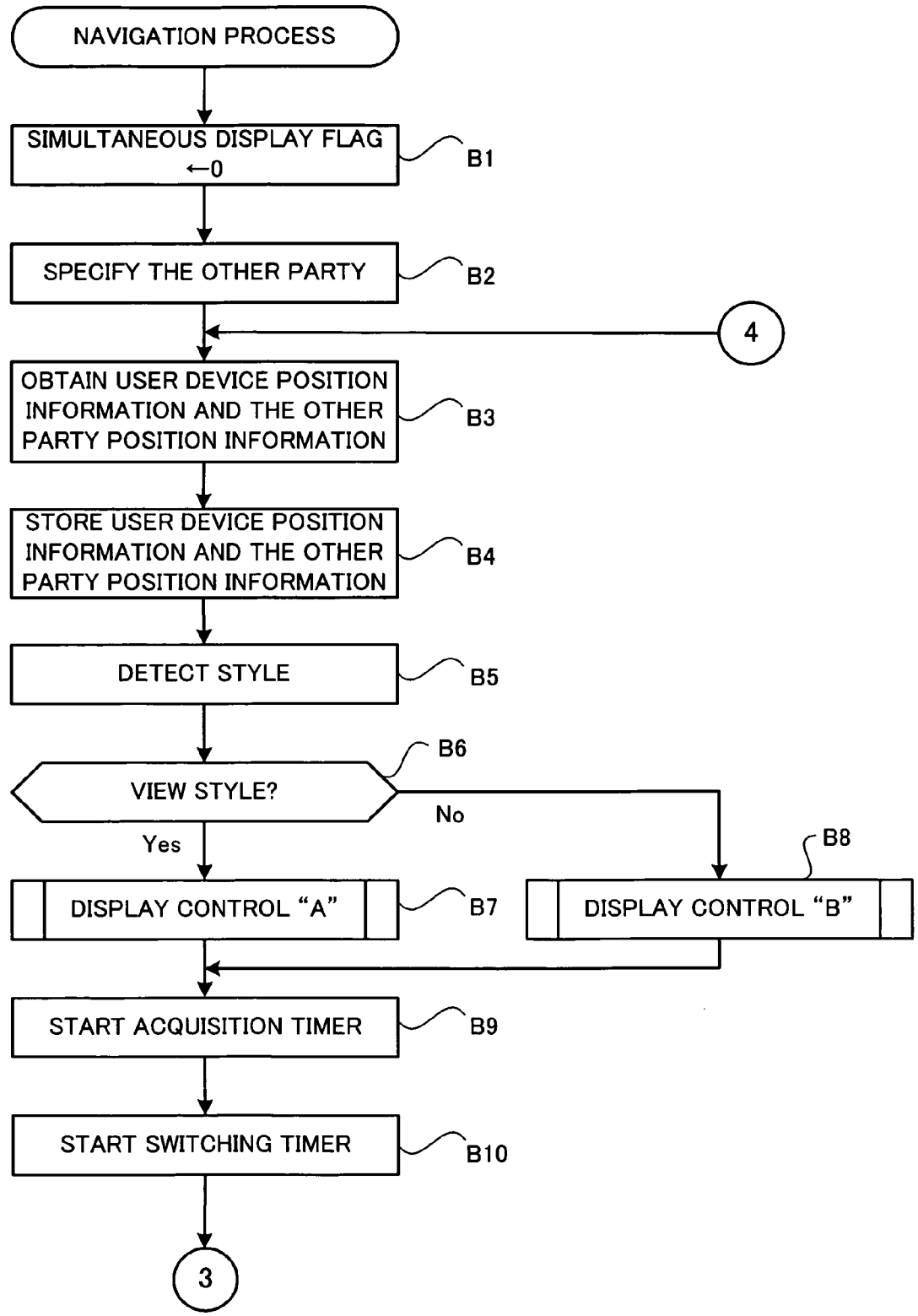
FIGS. 8A and 8B are flowcharts detailing the navigation process (step A6 in FIG. 7A)
Figure 8B:
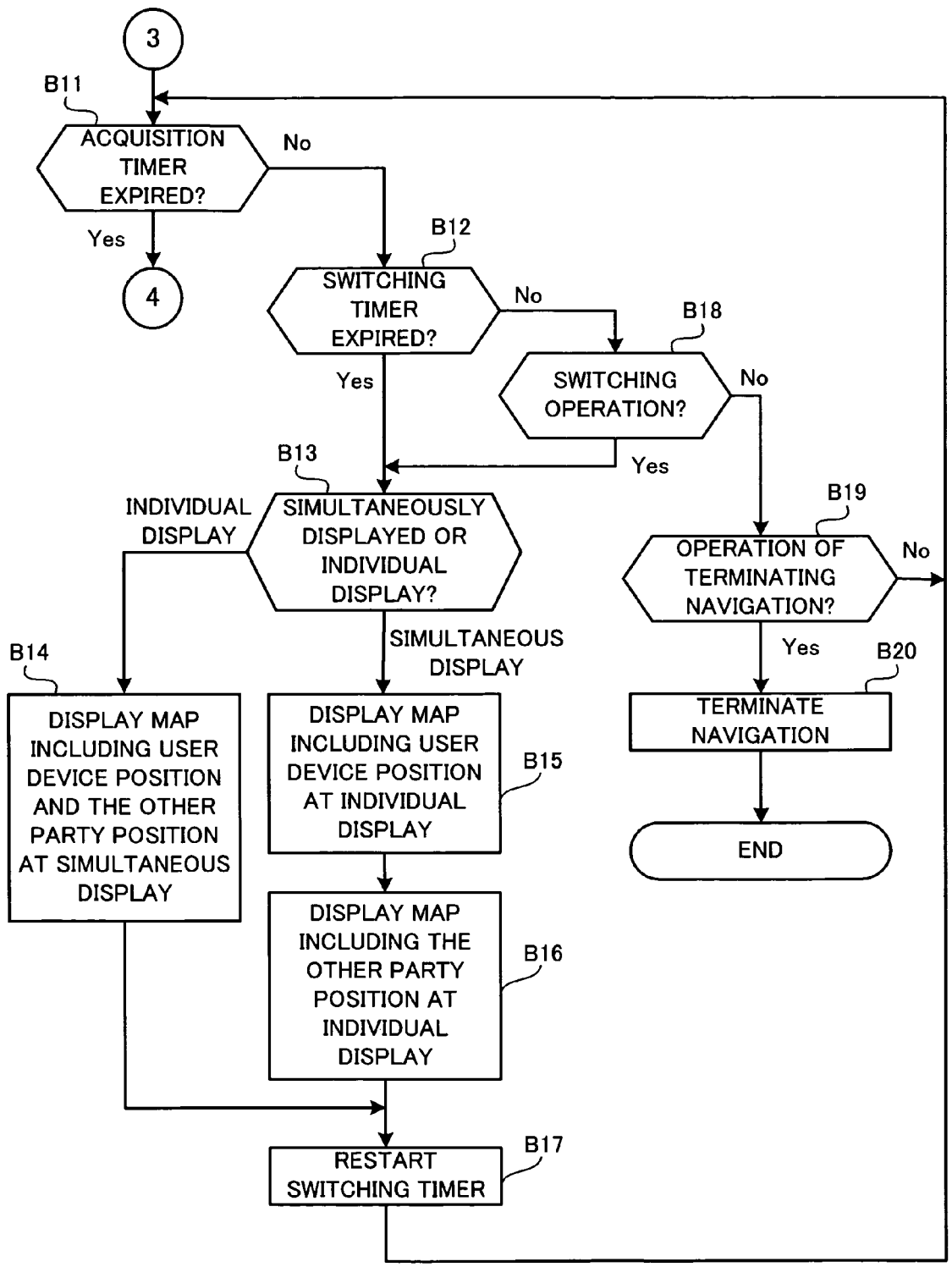

When the navigation process shown in FIG. 8A starts, the controller 11 first resets the "simultaneous display flag" stored in the RAM 13 to "0" (step B1). When the user specifies the other party whose position will be displayed on a map by the user operating the operating unit KB (step B2), the controller 11 issues an inquiry for the user device position information and the other party position information, and obtains the respective position information (step B3). The controller 11 then obtains the current time from the RTC 17, and stores the time information, user device position information, and the other party position information in the position information M1 of the RAM 13 (step B4).

The controller 11 then inquires to the style detecting unit 18 and obtains the current style information (step B5). The controller 11 determines whether or not the current style is the "view style" based on the obtained style information (step B6). When the current style is determined to be the "view style" as a result of the determination by the controller 11 (step B6: YES), the routine moves to the process of display control A (step B7). When the current style is determined not to be the "view style" (step B6: NO), the routine moves to the process of display control B (step B8).

Figure 9:
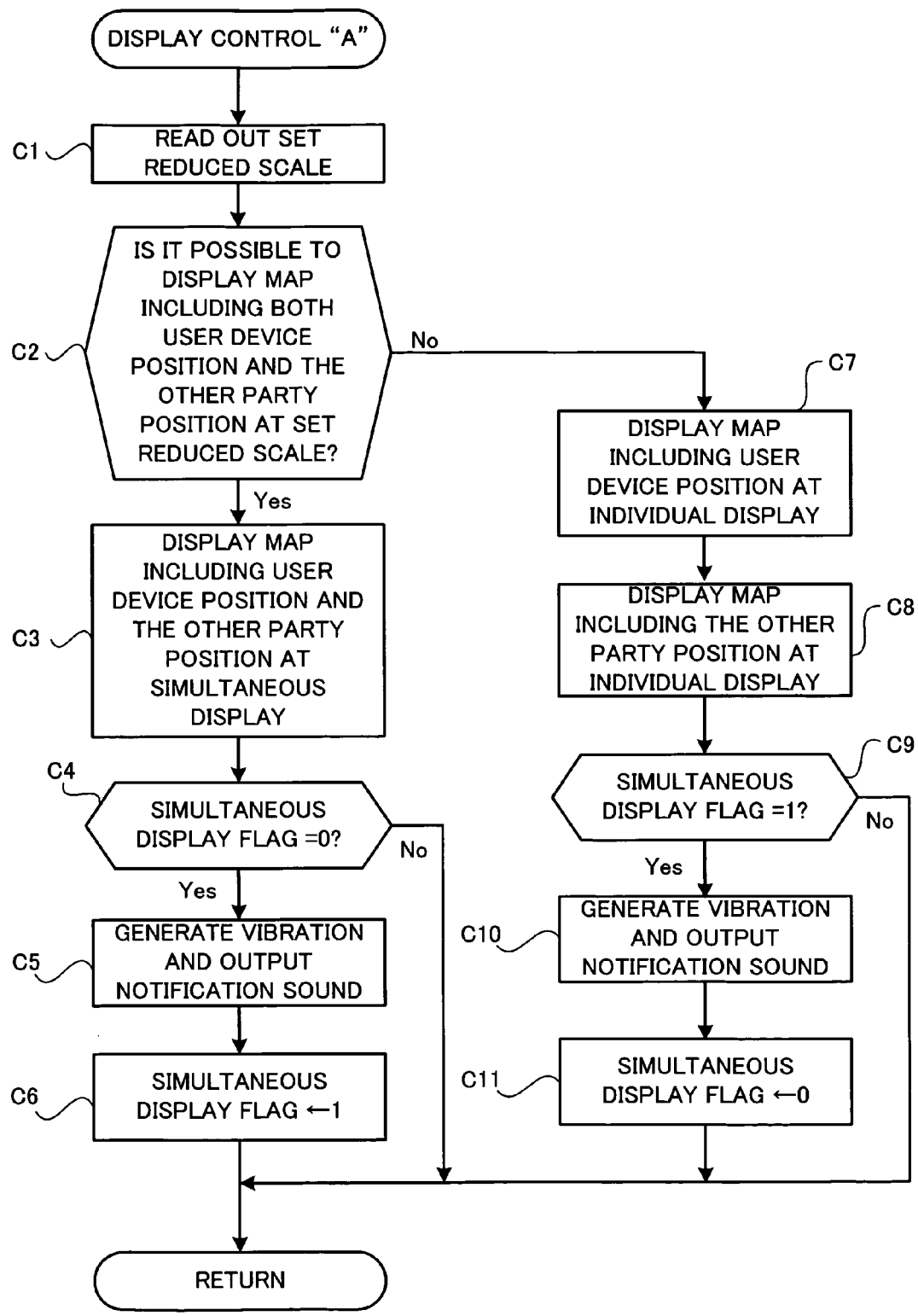
FIG. 9 is a flowchart detailing the process of display control A executed in the view style.

When the process of the display control A shown in FIG. 9 begins, the controller 11 first references the setting information M2 that is stored in the RAM 13 and reads out the reduced scale value corresponding to "reduced scale" (step C1). The controller 11 then references the position information M1 stored in the RAM 13 and reads out the position information stored in "user device position information" and "other party user information" corresponding to the latest time information stored in "date/hour." The controller 11 then calculates the distance between both parties from the respective position information. The controller 11 then determines whether or not the calculated distance is a distance which allows the positions of both parties to be displayed on the screen when the map created at the reduced scale, which was read in step C1, is displayed on the screen of the display panel DP as an integrated screen (step C2).

When the controller 11 has determined that the positions of both parties cannot be displayed on the reduced scale map (step C2: NO), the controller 11 logically splits the screen of the display panel DP and displays, on one of the screens, a map of the surroundings of the user device that includes a mark representing the user device position based on the user device position information read from the position information M1 (step C7). The controller 11 also displays, on the other screen, a map of the surroundings of the other party that includes a mark representing the position of the other party based on the other party position information read from the position information M1 (step C8).

In this split display example, the map that includes the user device position is displayed in the bottom screen of the display panel DP, as shown in FIG. 6A. The map that includes the other party position is also displayed in the top screen of the display panel DP.

The controller 11 then determines whether the "simultaneous display flag" is set at "1," that is, whether the display state has been switched from the "simultaneous display" state to "individual display" state (step C9). If the "simultaneous display flag" was set at "0" when the navigation function was started (step C9: NO), the process of display control A ends. If the condition of the display is switched from the "simultaneous display" state to the "individual display" state when the "simultaneous display flag" is set at "1" (step C9: YES), the controller 11 instructs the vibrator 16 to generate a vibration to notify the user of the switch (step C10), and sets the "simultaneous display flag" to "0" (step C11).

On the other hand, when the controller 11 has determined that the positions of both parties can be displayed on a reduced scale map (step C2: YES), the controller 11 references the position information M1 stored in the RAM 13 and reads out the position information stored in the "user device position information" and "the other party position information" corresponding to the latest time information stored in "date/hour." The controller 11 then creates a map with marks that respectively correspond to the user position information and the other party position information read from the position information M1 added into the reduced scale map read in step C1, and displays the created map on the screen of the display panel DP (step C3).

For example, a single map that indicates the user device position information and the other party position information is displayed as an integrated screen on the screen of the display panel DP, as shown in FIG. 6B.

At this time the controller 11 references the "simultaneous display flag" stored in the RAM 13, and ends the display control A if the flag is set at "1" (step C4: NO).

When the "simultaneous display flag" is set at "0" (step C4: YES), the controller 11 instructs the vibrator 16 to generate a vibration. The controller 11 also reads the audio data stored in the ROM 12, and notifies the user by outputting the audio data from the microphone MC of the audio signal processing unit 15 (step C5).

The controller 11 then sets the "simultaneous display flag" stored in the RAM 13 to "1" (step C6).

Figure 10:
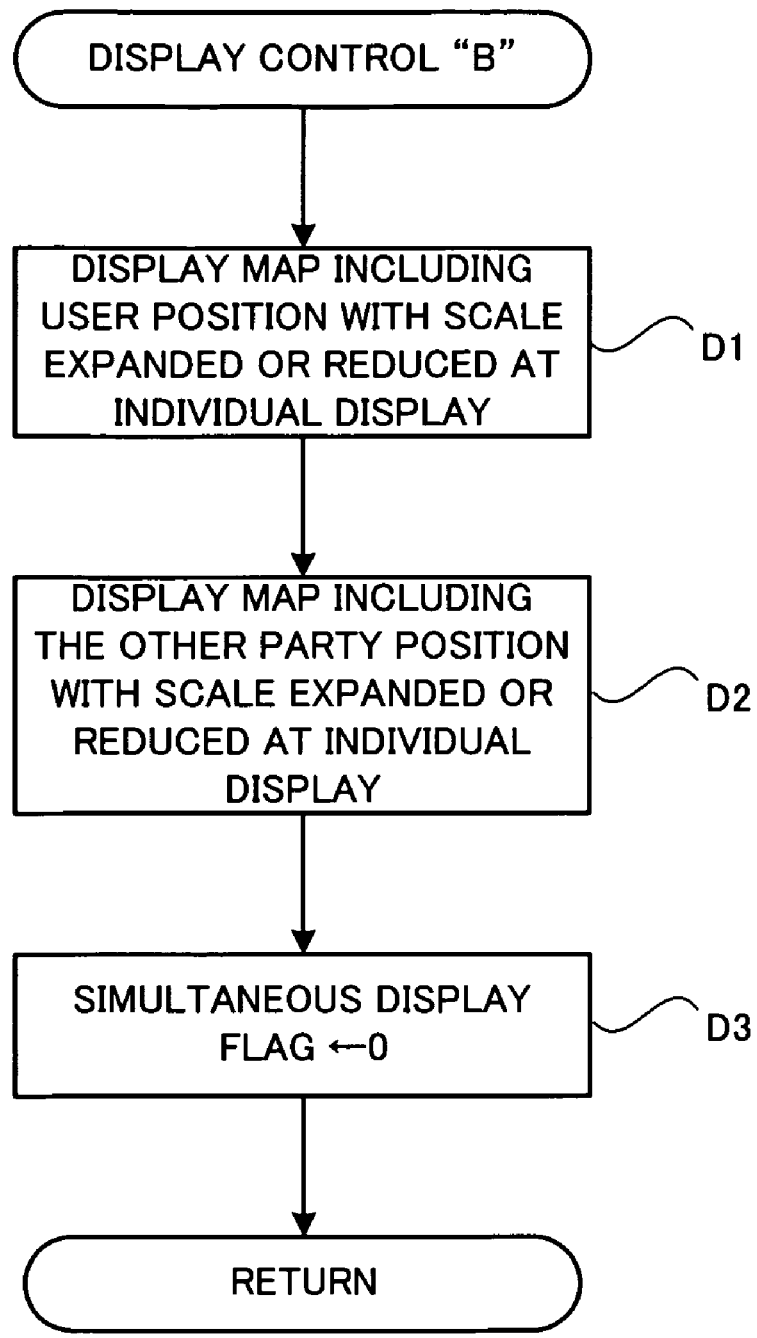
FIG. 10 is a flowchart detailing the process of display control B executed in styles other than the view style.

Returning to the navigation process shown in FIG. 8A, the process of display control B is started when the style information obtained by the controller 11 from the style detecting unit 18 is a style other than the "view style" (step B6: NO), as shown in FIG. 10.

When the process of the display control B starts, the controller 11 references the position information M1 stored in the RAM 13, and reads out the position information stored in the "user device position information" and "the other party position information" corresponding to the latest time information stored in the "date/hour." The controller 11 then logically splits the screen of the display panel DP, and displays, on one screen, a map of the surroundings of the user device that includes a mark representing the position of the user device based on the user device position information read from the position information M1 (step D1).

The controller 11 also displays, on the other screen, a map of the surroundings of the other party that includes a mark representing the position of the other party based on the other party position information read from the position information unit M1 (step D2). The controller 11 then sets the "simultaneous display flag" stored in the RAM 13 to "0" (step D3), and the display control B ends.

When the display control A (step B7) or the display control B (step B8) ends, the routine returns to the navigation process shown in FIG. 8A.

After the display control A (step B7) or the display control B (step B8) ends, the controller 11 reads the setting values of the "acquisition timer" and "switching timer" from the setting information M2, sets the read values as the initial values of the respective acquisition timer and switching timer, and starts the measurement operations of the acquisition timer and the switching timer (steps B9 and B10 in FIG. 8A).

The process continuing to the flowchart of FIG. 8B, a determination is subsequently made as to whether the acquisition timer has expired (step B11) or the switching timer has expired (step B12). If expiration of the acquisition timer is detected at this time (step B11: YES), the routine returns to step B3 of FIG. 8A, the user device and the other party position information are obtained and stored together with the current date and hour in the position information M1 (steps B3 and B4), and the subsequent operations are performed in the same manner as previously described.

Moreover, when the expiration of the switching timer is detected (step B12: YES in FIG. 8B), the controller 11 determines whether or not the user device position information and the other party position information are being displayed simultaneously, that is, the controller 11 determines whether the current display is "simultaneous display" or "individual display" (step B13). If the current display is the "individual display," the navigation process advances to step B14 to switch from the "individual display" to the "simultaneous display." The controller 11 then performs controls to use the display panel DP as an integrated screen, converts the map data that includes the user device position information and the other party position information to the reduced scale that can be displayed on the integrated screen, and displays the map data on the screen.

When the current display is the "simultaneous display (step B13), the controller 11 performs controls to split the display panel DP into two screens in order to switch from the "simultaneous display" to the "individual display." Specifically, the controller 11 expands and displays the map data of the surroundings that include the user device position information at an expanded reduced scale on one of the split screens (step B15), and expands and displays the map data that include the other party position information at an expanded reduced scale in the other split screen (step B16). After the switching timer has been restarted (step B17), the navigation process returns to the previously described step B11.

The controller 11 determines whether the user device position information and the other party position information are being displayed simultaneously (step B13) even after performing the switching operation that directs the switching from the "simultaneous display" to the "individual display" by user operation (step B18: YES). As a result, the controller 11 switches from the "individual display" to the "simultaneous display" (step B14), or switches from the "simultaneous display" to the "individual display" (steps B15 and B16). Thereafter, the process returns to the previously described step B11 and the above operation is repeated until an ending operation is performed that directs to terminate the navigation process (step B19: YES). When it is performed to end the navigation operation by user operation (step B19: YES), the controller 11 executes an operation to terminate navigation such as erasing the screen display or the like (step B20), and the navigation process returns to the standby state of FIG. 7A.

In the standby state, the controller 11 checks for the presence of a message from the wireless communication unit 14 (step A7), checks for the presence of a power OFF operation (step A9), and checks for other operations (step A11). When a message is detected at this time (step A7: YES), the controller 11 performs a calling process in response to the call connection with the other party (step A8). When the user performs the power OFF operation (step A9: YES), the controller 11 performs the power OFF process (step A10). When the user performs another operation (step A11: YES), the controller 11 executes the other process according to the operation performed by the user. This process may be, for example, a sending process, mail creation process and the like (step A12).

In the present embodiment as described above, the controller 11 controls the map display without burdening the user with performing specific operations by automatically switching between the "individual display" and the "simultaneous display" in accordance with the result of a determination as to whether or not it is possible to display, at a predetermined reduced scale, map data that includes the position information of both the user device and the other party based on the relationship between the reduced scale of the map and the distance between the user device and the other party. This arrangement is both effective and useful inasmuch as the user can thus confirm details of the surroundings of the user device position and the other party position, as well as easily confirm the positional relationship between the user device and the other party.

When the display panel DP is used as an integrated screen with a "reduced scale", which has been optionally set by user operation and stored in the setting information M2, the controller 11 reads out the "reduced scale" from the setting information M2 and determines whether or not the map data that includes the user device and the other party position information can be displayed on the integrated screen at the reduced scale. It is thus possible to display a map on the screen at a desired reduced scale.

The controller 11 switches between the "individual display" and the "simultaneous display" in accordance with the result of the determination as to whether or not a map that includes both positions can be displayed based on the relationship between the reduced scale of the map and the distance between the user device and the other party. The controller 11 also periodically switches between the "individual display" and the "simultaneous display" each time the switching timer expires. Moreover, the controller 11 switches between the "individual display" and the "simultaneous display" each time the user performs a switching operation. The convenience of the user is thus increased.

The user is notified of the switch when the controller 11 switches between the "individual display" and the "simultaneous display" in accordance with the result of the determination as to whether or not a map that includes both positions can be displayed based on the relationship between the reduced scale of the map and the distance between the user device and the other party. The user is thus aware when he is within a set distance from the other party because the user is notified of the switch from the "individual display" to the "simultaneous display". The user is also aware when he is farther than the set distance from the other party because the user is notified of the switch from the "simultaneous display" to the "individual display". User misperception and misrecognition of the "individual display" and "simultaneous display" are thus effectively prevented.

If the "view style" is detected as the current style as a result of the determination of the style based on the detection signal from the style detecting unit 18, the controller 11 executes the display control A and switches between the "individual display" and the "simultaneous display" according to the result of the determination as to whether or not both positions can be displayed based on the relationship between the reduced scale of the map and the distance between the user device and the other party. If the current style is not the view style, the controller 11 executes the display control B and continues the "individual display" without switching between the "individual display" and the "simultaneous display." This arrangement is therefore beneficial to the user inasmuch as, for example, switching may be accomplished by an operation in an easy-to-operate style (a style with many exposed operation buttons) such as a non-view style, and switching may be accomplished automatically in a difficult-to-operate style (a style with few exposed operation keys) such as the view style.

The latest position information can be periodically displayed because the controller 11 obtains the position information of the user device and the other party and stores the position information together with the current date and hour in the position information M1 when the controller 11 detects the expiration of a timer.

Although the embodiment has been described above by way of an example in which a user and the other party mutually approach each other for a meeting as an example of the practical use of the navigation function, the present embodiment may also be applied when a user goes to a destination. There is no need to periodically obtain the position information of the destination in this case since the position of the destination is invariable, therefore only the initial obtained position information needs to be stored in the category of "the other party position information" of the position information M1. Furthermore, the controller 11 is not limited to periodically obtaining the position information inasmuch as, for example, the timing for obtaining the position information is discretionary and the intervals at which the position information is obtained may be varied according to the speed of travel. Neither is the present invention limited to displaying the position information of the user device and the position information of the other party on a screen inasmuch as an application that displays the position information of two parties that do not include the user device is also possible.

In addition, the electronic device is not limited to a portable telephone device inasmuch as the present invention is similarly applicable to a PDA (Personal Digital Assistants), an electronic camera, an electronic wristwatch, a music player and the like that is provided with a navigation function, as well as an automobile navigation device.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2007-161117 filed on Jun. 19, 2007 and including specification, claims, drawings and summary. The disclosure of the above Japanese Patent Application is incorporated herein by reference in its entirety.

What is claimed is:

1. An electronic device comprising:
    a device body comprising a display panel which is splittable into a plurality of screens, the electronic device being configured to control whether the display panel is used as one of a plurality of split screens and an integrated screen of combined individual split screens;
    a position obtainer that obtains a first position information and a second position information;
    a first controller that performs splitting control to split the display panel for use as the plurality of screens, and display control to display map data including the first position information and map data including the second position information on each separate split screen;
    a second controller that performs integration control to use the display panel as an integrated screen, and display control to display the map data including the first and the second position information on the integrated screen;
    a determiner that determines whether the map data that includes the first and the second position information is displayable on the display panel at a predetermined reduced scale;
    a first switcher that switches between the splitting control by the first controller and the integration control by the second controller based on a determination result of the determiner;
    a second switcher that switches by operation of an operator comprising a key for the second switcher between the control by the first controller and the control by the second controller when the function by the first switcher is restrained regardless of the determination result of the determiner; and
    a style detector that detects a style of the device body of the electronic device;
    wherein the first switcher accomplishes switching so that the integration control and the display control are performed by the second controller when the determiner determines that the map data including the first and the second position information is displayable on the display panel at the predetermined reduced scale, while the first controller is performing the splitting control and the display control; and
    wherein the first switcher switches between the splitting control and the integration control when the style detected by the style detector is a style in which an area at which the operator is disposed is enclosed by a portion of the electronic device.

2. The electronic device of claim 1, wherein while the second controller is performing the integration control and display control, the first switcher accomplishes switching so that the splitting control and display control are performed by the first controller when the determiner has determined that the map data including the first and the second position information cannot be displayed on the display panel at the predetermined reduced scale.

3. The electronic device of claim 1, wherein the predetermined reduced scale is a reduced scale that is set in accordance with a user operation; and the determiner determines whether the map data including the first and the second position information is displayable on the integrated screen at the predetermined reduced scale when the display panel is used as the integrated screen.

4. The electronic device of claim 1, wherein the second switcher executes the switching of the control at predetermined times.

5. The electronic device of claim 1, wherein the second switcher executes switching of the control in accordance with a user operation.

6. The electronic device of claim 1, further comprising:
    a notifier that provides a summary of the switching between the control by the first controller and the control by the second controller performed by the first switcher.

7. The electronic device of claim 1, wherein switching of the control by the first switcher is inhibited when another style is detected.

8. The electronic device of claim 1, wherein the position obtainer obtains at least one of position information of the first position information and second position information at predetermined times.

9. A non-transitory recording medium storing a program which is implemented in an electronic device that allows a computer provided in the electronic device to execute:
    a first step in which a first position information and a second position information are obtained;
    a second step in which splitting control to split a display panel for use as a plurality of screens, and display control to display map data that includes the first position information and map data that includes the second position information on each separate split screen are performed;
    a third step in which integration control to use the display panel as an integrated screen, and display control to display the map data that includes the first and the second position information on the integrated screen are performed;
    a fourth step in which whether the map data that includes the first and the second position information is displayable on the display panel at a predetermined reduced scale is determined;
    a fifth step in which switching between the splitting control and the display control that displays map data on the split screens, and the integrating control and display control that displays the map data on the integrated screen is performed based on a determination result; and
    a sixth step in which switching by operation of an operator comprising a key between control by a first controller and control by a second controller when the fifth step suspends its function, regardless of the determination result of a determiner;

wherein the fifth step accomplishes switching so that the integration control and the display control are performed by the sixth step when the map data including the first and the second position information is displayable on the display panel at the predetermined reduced scale is determined, while the splitting control and the display control is performed;

wherein the electronic device comprises a style detector that detects a style of a device body of the electronic device;

wherein the electronic device is modifiable in a plurality of styles by changing a layout of a plurality of casings that configure the device body; and wherein the fifth step is performed when the style detected by the style detector is a style in which the operator is covered by a part of the electronic device, performance of the fifth step being inhibited when another style is detected.

\* \* \* \* \*